United States Patent
Koch et al.

(10) Patent No.: US 12,500,459 B2
(45) Date of Patent: Dec. 16, 2025

(54) STATOR FOR AN ELECTRIC MOTOR, ELECTRIC MOTOR, AND SPRING ELEMENT FOR A STATOR

(71) Applicant: Brose Fahrzeugteile SE & Co. Kommanditgesellschaft, Würzburg, Würzburg (DE)

(72) Inventors: Kevin Koch, Fürth (DE); Michael Düncher, Würzburg (DE); Daniel Hirsch, Höchberg (DE)

(73) Assignee: Brose Fahrzeugteile SE & Co. Kommanditgesellschaft, Wuerzburg, Wuerzburg (DE)

(*) Notice: Subject to any disclaimer, the term of this patent is extended or adjusted under 35 U.S.C. 154(b) by 285 days.

(21) Appl. No.: 17/965,955

(22) Filed: Oct. 14, 2022

(65) Prior Publication Data

US 2023/0042306 A1    Feb. 9, 2023

Related U.S. Application Data

(63) Continuation of application No. PCT/EP2021/059502, filed on Apr. 13, 2021.

(30) Foreign Application Priority Data

Apr. 14, 2020   (DE) .................... 10 2020 204 702.2
Jun. 3, 2020   (DE) .................... 10 2020 206 949.2

(51) Int. Cl.
*H02K 1/18*    (2006.01)
*H02K 1/14*    (2006.01)

(52) U.S. Cl.
CPC ............. *H02K 1/185* (2013.01); *H02K 1/148* (2013.01)

(58) Field of Classification Search
CPC .......... H02K 1/148; H02K 1/185; H02K 1/12; H02K 11/21; H02K 21/14; H02K 5/1677
See application file for complete search history.

(56) References Cited

U.S. PATENT DOCUMENTS

| | | | |
|---|---|---|---|
| 4,603,273 A | 7/1986 | McDonald | |
| 8,203,248 B2* | 6/2012 | Bauch | H02K 1/12 310/216.131 |
| 2002/0079781 A1 | 6/2002 | Walko et al. | |
| 2007/0286753 A1 | 12/2007 | Ihle et al. | |
| 2017/0284395 A1* | 10/2017 | Fukasaku | F04C 21/00 |
| 2021/0006102 A1* | 1/2021 | Büttner | H02K 1/185 |

FOREIGN PATENT DOCUMENTS

| | | |
|---|---|---|
| DE | 596011 C | 4/1934 |
| DE | 3837844 A1 | 5/1990 |
| DE | 102007058072 A1 | 6/2009 |
| DE | 202008015575 U1 | 5/2010 |

(Continued)

*Primary Examiner* — Leda T Pham
(74) *Attorney, Agent, or Firm* — Laurence A. Greenberg; Werner H. Stemer; Ralph E. Locher (57) ABSTRACT

A stator for an electric motor has a stator main body with stator teeth arranged in the form of a star and a stator yoke. The stator main body is formed with a number of axial grooves on an outer circumference. Spring elements are inserted into the axial grooves and the spring elements circumferentially protrude in the radial direction from the stator main body. The spring elements are introduced with a radial form-fit.

11 Claims, 6 Drawing Sheets

(56) References Cited

FOREIGN PATENT DOCUMENTS

| | | |
|---|---|---|
| DE | 102013009407 A1 | 12/2014 |
| DE | 102016218345 A1 | 4/2017 |
| DE | 102017106762 A1 | 10/2017 |
| EP | 3493369 A1 | 6/2019 |
| JP | S554624 U | 1/1980 |
| JP | 2014018001 A | 1/2014 |
| JP | 2015082915 A | 4/2015 |

* cited by examiner

STATOR FOR AN ELECTRIC MOTOR, ELECTRIC MOTOR, AND SPRING ELEMENT FOR A STATOR

CROSS-REFERENCE TO RELATED APPLICATION

This application is a continuation, under 35 U.S.C. § 120, of copending International Patent Application PCT/EP2021/059502, filed Apr. 13, 2021, which designated the United States; this application also claims the priority, under 35 U.S.C. § 119, of German Patent Applications DE 10 2020 204 702.2, filed Apr. 14, 2020, and DE 10 2020 206 949.2, filed Jun. 3, 2020; the prior applications are herewith incorporated by reference in their entirety.

FIELD AND BACKGROUND OF THE INVENTION

The invention relates to a stator for an electric motor, in particular for an electric motor of a motor vehicle. The electric motor has a stator main body which has stator teeth in a star-shaped arrangement, and has a stator yoke. The invention furthermore relates to an electric motor having such a stator which is disposed in a motor housing, and to a spring element for a stator of this type.

Electric motors are used in a variety of ways as drives for various actuating elements in a modern motor vehicle. For example, electric motors are used as actuators in power windows, electric sunroofs or as seat adjustment drives, as electrical power steering (EPS), as radiator fan drives or as transmission actuators. Electric motors of this type have to have a relatively high torque or output density and also be operationally reliable at high temperatures.

An electric motor as a power converter for converting electric power into mechanical power comprises a stator which forms the stationary motor part, and a rotor which forms the moving motor part. In the case of an internal rotor electric motor the stator is usually provided with a stator yoke on which stator teeth that protrude inward in a radial, i.e. star-shaped, manner toward the center are disposed, the free ends of said stator teeth that face the rotor forming the so-called pole shoe. Windings or coils which are wired so as to form the stator winding and generate a magnetic field during the electromotive operation are applied to the stator teeth. In order for the magnetic field generated by the energized windings to be guided and amplified, the stator material is usually metallic, for example made of soft magnetic iron.

With a view to an operationally reliable motor operation at a reduced noise level it is necessary for the stator to be reliably mounted in the motor housing. Particularly desirable here is also an anti-rotation safeguard for the stator, which secures the stator in relation to tangential rotation, or prevents any such mechanical rotation, respectively.

Stators in electric motors are typically mounted to the housing by way of an interference fit, or by means of additional damping or decoupling elements. In the process, the stators are pressed into the motor housing in a force-fitting manner, or joined to the housing under the effect of force, respectively.

If the stator is fixed and mounted by way of an interference fit, deformations that are generated by virtue of the electromagnetic forces during the operation of the motor are transmitted directly to the housing. The stator can be deformed as a consequence of operation-related electromagnetic forces in particular in the case of synchronous motors, wherein deformations of this type can be very large in the case of a 10-pole electric motor, for example, so that a high level of structure-borne noise is transmitted to the motor housing that receives the stator. Therefore, the stator should be decoupled from the housing in order for the transmission of the structure-borne noise to be reduced. If the stator is mounted by way of damping or decoupling elements, additional elements may optionally be required for fixing and securing the stator against rotation.

A stator for an electric motor which is formed from a star-shaped stator lamination stack and from a cylindrical stator yoke formed from stacked annular laminations, the star-shaped stator lamination stack being inserted in said stator yoke, wherein a number of the annular laminations on the external circumference each have at least one bending tab, is known from German published patent application DE 10 2013 009 407 A1. Fixing the stator in a housing while simultaneously centering and positioning said stator is made possible by means of radially extending bending tabs. In the assembled state, the stator here bears on the housing internal wall only by way of bearing points that are provided at exposed locations and formed by the bending tabs. If the individual annular laminations are provided with notches into which the bending tabs can be bent prior to or during the process of assembling the stator with the housing, a space-saving construction of an electric motor having a stator inserted in the housing of the latter is moreover possible.

Japanese published patent application JP 2014-018001 A1 discloses a stator of an electric motor that is to be fixed in a predetermined position within the motor housing by means of spring lugs, wherein the fixing lugs by way of one end are held on the housing. The other end of the fixing lugs, which protrudes obliquely into the housing interior, lies in an axial assembly groove on the external circumference of the stator.

An electric motor having a stator which is constructed from a lamination stack and disposed in a housing, wherein the laminations are held together by means of a spring clamp which engages axially across the lamination stack and supports the latter radially on the internal wall of the housing, is known from German published patent application DE 10 2007 058 072 A1 and its counterpart U.S. Pat. No. 8,203,248 B2. The spring clamp has a spring spine that projects radially from the external circumference of the lamination stack and on the opposite narrow sides has tension feet which engage across the lamination stack on the end side.

SUMMARY OF THE INVENTION

With the above and other objects in view there is provided, in accordance with the invention, a stator for an electric motor. It is a specific object of the invention to provide a stator that is particularly suitable in terms of decoupling, so as to reduce the transmission of structure-borne noise to a motor housing. The stator here is to be able to be inserted into, or assembled in, the housing and decoupled therefrom in a simple manner. Furthermore, an anti-rotation safeguard of the stator in the motor housing is to be implemented. It is a further object of the invention to specify a particularly suitable electric motor having such a stator in a housing (motor housing), as well as to specify a suitable spring element for a stator of this type.

With the above and other objects in view there is provided, in accordance with the invention, a stator for an electric motor, the stator comprising:
a stator main body formed with stator teeth in a star-shaped arrangement and a stator yoke;

said stator main body having an external circumference formed with a number of axial grooves; and spring elements inserted with a radial form-fit in said axial grooves and projecting radially on the external circumference of said stator main body.

The stator according to the invention is configured for an electric motor, in particular for an electric motor of a motor vehicle. To this end, the stator has a stator main body with a stator yoke as the back iron and having a number of stator teeth which extend radially inward in the direction of a central stator or motor axis and end in a so-called pole shoe. The stator main body is embodied as, for example, a solid body, as a so-called individual tooth design, or as a star yoke design in which the stator teeth, for example as a star wheel, are inserted into a cylindrical stator yoke.

A number of axial grooves are provided on the external circumference of the stator main body, spring elements projecting radially on the circumference of the stator main body being inserted radially and preferably tangentially in a form-fitting manner in said axial grooves. According to the invention, in this way the, or each, spring element at least partially projects radially from the external circumference. In other words, the at least one spring element at least in portions protrudes radially from the axial groove.

The terms "form-fit" or a "form-fitting connection" between at least two parts connected to one another, which might also be referred to as a positive lock or positive connection, are understood to mean in particular that the mutual engagement of the parts connected to one another at least in one direction—here, the radial direction relating to the central axis of the stator and to the rotation axis of the electric motor—is effected by contours of the parts per se engaging directly in one another. The "blocking" of a mutual movement in this direction, here the radial direction, thus takes place by virtue of the shape. The assembly element in the present case is thus held radially in a form-fitting manner in the axial groove of the stator tooth.

An "axial groove" is presently and hereunder understood to mean in particular a radially inward-directed groove, or a groove-type clearance of the external circumference, which extends along the axial direction of the stator.

The terms "axial" or "axial direction" are understood to mean in particular a direction parallel to (or coaxial with) the rotation direction of the electric motor, thus perpendicular to the end sides of the stator. Accordingly, the terms "radial" or "radial direction" are understood to mean in particular a direction along a radius of the stator, or of the electric motor, respectively, said direction being oriented so as to be perpendicular (transverse) to the rotation axis of the electric motor. "Tangential" or a "tangential direction" is presently and hereunder understood to mean in particular a direction along the circumference of the stator or of the electric motor (circumferential direction, azimuthal direction), thus a direction perpendicular to the axial direction and to the radial direction.

Radial fixing of the stator in a motor housing is made possible as a result of the spring elements at least partially projecting radially from the external circumference, or protruding radially from the axial groove, respectively. A resilient and thus damping or vibration-reduced mounting of the stator within the motor housing is made possible the spring elements. Furthermore, an anti-rotation safeguard in terms of mechanical rotation of the stator in the motor housing is also formed by the spring elements. A particularly suitable stator for an electric motor is implemented as a result.

In one preferred configuration, the, or each, axial groove is embodied as a radial undercut, or as a radial undercut of the external circumference. As a result, mounting or fixing the spring element in a reliable and operationally safe, radially form-fitting manner in the axial groove is implemented by way of a simple construction.

The assembly element which preferably acts as a decoupling or damping element and by inserting or plugging-in in the axial direction is inserted into the respective axial groove of the stator main body proximal to the yoke or the back iron, respectively, suitably engages the undercut formed in the axial groove from the rear. To this end, the respective axial groove in cross section is in the shape of a dovetail or T-shaped, for example. It is essential that the axial groove provides a radial undercut which is at least partially engaged from the rear by the spring element. Other shapes (cross-sectional shapes) of the axial groove are also conceivable, for example a segment of a circle or a T-shape having a local elevation or a local depression (trench) in the groove base of the horizontal T-leg of the axial groove.

An axial groove as is described in German patent application 102019208426.5, filed by the applicant on Jun. 11, 2019, and not yet published, is particularly preferred. The content of the said application, in particular the claims (including the associated explanations) is herewith incorporated by reference into the present application. In terms of the radial undercut of the axial groove, reference is especially made to claims 2 and 3 and the associated embodiments, especially on pages 3/4 and 8/9, and to FIGS. 6 to 12.

In accordance with an advantageous embodiment of the invention, the spring element has a main body, preferably in the shape of a small plate or strip, and at least one first coupler spring or spring arm which stands proud in the radial direction and protrudes from the axial groove. Mounting the stator in a motor housing so as to be reliably damped or vibrationally decoupled is made possible as a result.

In one expedient embodiment, the first coupler spring, hereunder also referred to as the radial spring, is connected to the main body in an integral manner, for example, thus being in one piece or monolithic with said main body. The radial spring here is in particular configured as a spring-elastic tab of the main body. The radial spring at one fixed end is thus connected to the main body, and by way of a free end at least partially protrudes radially from the axial groove. The spring element seated in the axial groove preferably forms a (mechanical) interface to a motor housing in which the stator is inserted. This interface has an in particular decoupling, damping, clamping, positioning and/or fixing effect (function). In an assembled state in which the stator is received within a motor housing, the free end of the radial spring bears resiliently or elastically on an internal wall of the motor housing.

The spring element preferably has more than one radial spring, thus a number of radial springs or at least two radial springs. The number of radial springs here is preferably adapted to a respective active partial length of the stator. In other words, it is possible for spring elements having dissimilar numbers of radial springs to be provided for dissimilar construction sizes of the stator. As a result, it is possible for the stator mounting to be adapted in a particularly flexible and suitable manner to an acoustic behavior in the operation of the motor.

In order for the acoustic behavior to be additionally or further improved, it is possible, for example, for the width of the radial springs and/or the material thickness of the radial springs, and thus the spring rate or the restoring force thereof, to be flexibly adapted to a respective electric motor and/or to a respective specific application. The conjunction "and/or" is presently and hereunder to be understood in such a manner that the features linked by means of this conjunction can be configured conjointly as well as mutual alternatives.

The main body, transversely to the axial direction, in the circumferential or tangential direction protrudes beyond the first coupler spring or radial spring on both sides. The main body by way of the azimuthally protruding portions on the longitudinal sides running in the axial direction engages from the rear the (azimuthal) groove legs of the axial groove that extends in the circumferential direction of the stator, as a result of which the radial form-fit between the spring element and the respective stator tooth is established.

In a suitable refinement, the spring element on a narrow side or end side of the main body has a second coupler spring which protrudes axially from the axial groove. The axial groove extends substantially across the complete axial construction length of the stator so that the second coupler spring rises axially from a stator end side. Therefore, the second coupler spring hereunder is also referred to as an axial spring. As a result of the axial spring, the spring element is thus also provided and suitable and specified for mounting and fixing the stator axially in a motor housing.

In one expedient configuration, the spring element or the axial spring suitably has a bearing edge or a bearing face by means of which the assembly element bears on an end side of the stator main body, in particular in the region of a respective stator tooth.

An advantageous integration of functions is implemented as a result of the radial springs and the axial spring. In particular, the spring element in this way is multifunctional, implementing a radial mounting and a tangential anti-rotation safeguard as well as an axial mounting of the stator.

The spring ends or free ends of the radial springs here bear in a form-fitting and/or force-fitting manner on the motor housing. The radial springs here act as a primary safeguard in relation to mechanical rotation of the stator along the tangential direction. The axial spring here acts as an additional, secondary safeguard in relation to the rotation, in that the stator by way of an axial force is pressed onto a bearing bracket for example by means of the axial springs. The axial spring by means of the bearing edge or the bearing face here is supported on the stator stack and in a spring installation space is compressed toward the motor bearing bracket. Furthermore, the secondary safeguard acts for tangential safeguarding by the axial spring, as well as a primary safeguard in relation to an axial movement of the stator.

In this way, reliable radial and axial mounting and fixing of the stator, as well as an anti-rotation safeguard, are implemented as a result of the multifunctional spring element.

The terms "force-fit" or "force-fitting" connection between at least two parts connected to one another, also referred to as a friction fit or non-positive fit, are understood to mean in particular that the parts connected to one another are prevented from sliding on one another by virtue of a frictional force acting therebetween. In the absence of a "connecting force" (meaning the force that presses the parts against one another, for example a screw force or the force of weight per se) that causes this frictional force, the force-fitting connection cannot be maintained and is thus released.

An additional or further aspect of the invention provides that the spring element on a longitudinal side of the main body has at least one clamping claw or interlocking cam for tangential and/or axial fastening or fixing in the axial groove. The respective clamping claw is suitably bent upward from the plane of the main body of the spring element. Reliable fixing (mounting, fastening) of the spring element in the axial groove of the stator main body assigned to said spring element is achieved as a result. This means that the spring element is embodied with an interlocking design so as to tangentially and/or axially interlock in the axial groove. Reliable form-fitting and/or force-fitting fixing of the spring element in the tangential direction is guaranteed as a result. The clamping claws or interlocking cams here are preferably disposed in pairs on the mutually opposite longitudinal sides of the main body. Three pairs of clamping claws are provided on the main body, for example.

In one design embodiment, which is particularly simple in terms of construction, the spring element is embodied as an integral stamped bent part, thus a single-piece or monolithic stamped bent part. Integral here means in particular that the at least one radial spring and the axial spring as well as the clamping claw(s) are embodied so as to be integral to the main body. A particularly cost-effective embodiment of the spring element using a reduced number of parts is implemented as a result, this having an advantageous effect on the production costs of the stator.

With the above and other objects in view there is also provided, in accordance with the invention, an electric motor with a motor shaft (rotor shaft) and a rotor fixed to the shaft, as well as a stator as described above and a housing in which the stator, by way of spring elements inserted axially in axial grooves on the external circumference and held radially in a form-fitting manner in the latter, is disposed in a clamping and/or damping manner so as in particular to be decoupled in terms of structure-borne noise. The stator by means of the axial springs of the spring elements inserted in the axial grooves is supported on a bearing bracket of the electric motor, such that it is also provided that the stator is decoupled from or damped in relation to the bearing bracket.

The advantages and design embodiments set forth in terms of the stator can also be applied in an analogous manner to the electric motor according to the invention, and vice versa.

The acoustic properties of the electric motor during the operation of the motor are improved as a result of the stator according to the invention, because generated oscillations and/or vibrations of the stator by virtue of the spring elements are not substantially transmitted to the motor housing as structure-borne noise. In other words, the oscillations and/or vibrations are transmitted to the motor housing by way of a reduced structure-borne noise amplitude. The reduced generation of noise also has an advantageous effect on the comfort of a user or driver, in particular in the case of installation situations close to the driver's cab of the motor vehicle, such as when the electric motor is used as a steering motor, for example.

The spring element according to the invention is provided and suitable and specified for use in an electric motor described above, or a stator. The statements in the context of the spring element here also apply in analogous manner to the stator and/or the electric motor, and vice versa.

The spring element here is in particular configured for being inserted or plugged into an axial groove of a stator, preferably in a radially form-fitting manner. To this end, the spring element has a main body having at least one first coupler spring which is preferably incorporated in the main body as a stamped tab, and is bent from plane of the main body. The spring element furthermore has a second coupler spring which is disposed on a narrow side or end side of the main body. A particularly suitable spring element is implemented as a result. Implemented in particular in this way is a multi-functional spring element which makes possible radial and axial mounting and fixing, as well as an anti-rotation safeguard, for a stator in a motor housing.

The spring element in the assembled state is preferably received so as to be radially form-fitting in an axial groove of the stator, wherein the main body is suitably provided with clamping claws for, in particular tangential, fixing in the stator groove. As a result, the spring element fixes itself in a self-acting manner in relation to the axial groove. The spring element preferably has three first coupler springs and one second coupler spring. The first coupler springs as radial springs, at least at the free ends, in portions protrude radially from the axial groove so that the first coupler springs center the stator while the latter is being assembled or installed in a motor housing. The radial first coupler springs here fix the stator tangentially (primarily) and axially (secondarily) in the housing. The second coupler spring fixes the stator axially (primarily) in the housing.

The spring element according to the invention is able to be adapted to a respective stator, or electric motor, respectively, in a particularly flexible manner. As a result, a particularly optimal adaptation to acoustic requirements of the electric motor by virtue of the variably configurable multi-functional spring elements in terms of the development parameters. This means that the spring elements in terms of, for example, width, number and material thickness of the coupler springs are adaptable to the respective application.

Other features which are considered as characteristic for the invention are set forth in the appended claims.

Although the invention is illustrated and described herein as embodied in a stator for an electric motor, an electric motor, and a spring element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Equivalent parts and variables are always provided with the same reference signs throughout the figures.

DETAILED DESCRIPTION OF THE INVENTION

Figure 1:
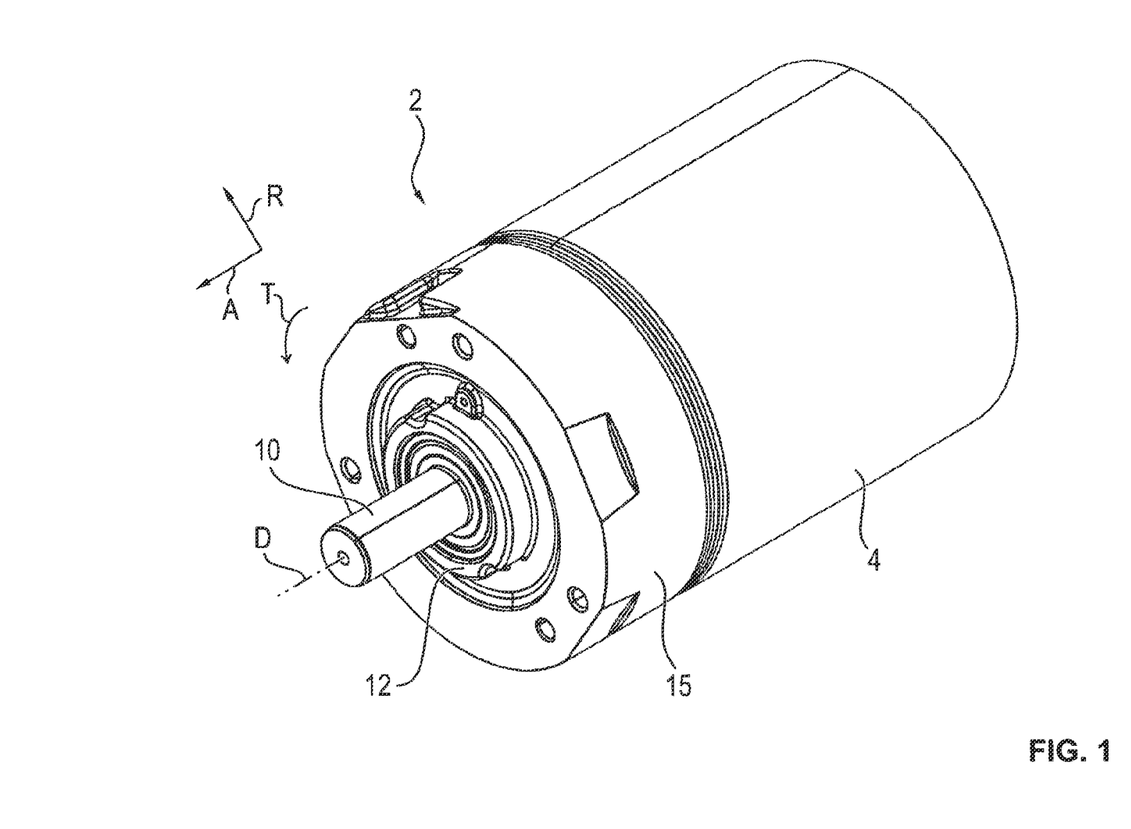
FIG. 1 is a perspective illustration showing an electric motor having a motor housing and a bearing bracket.
Figure 2:
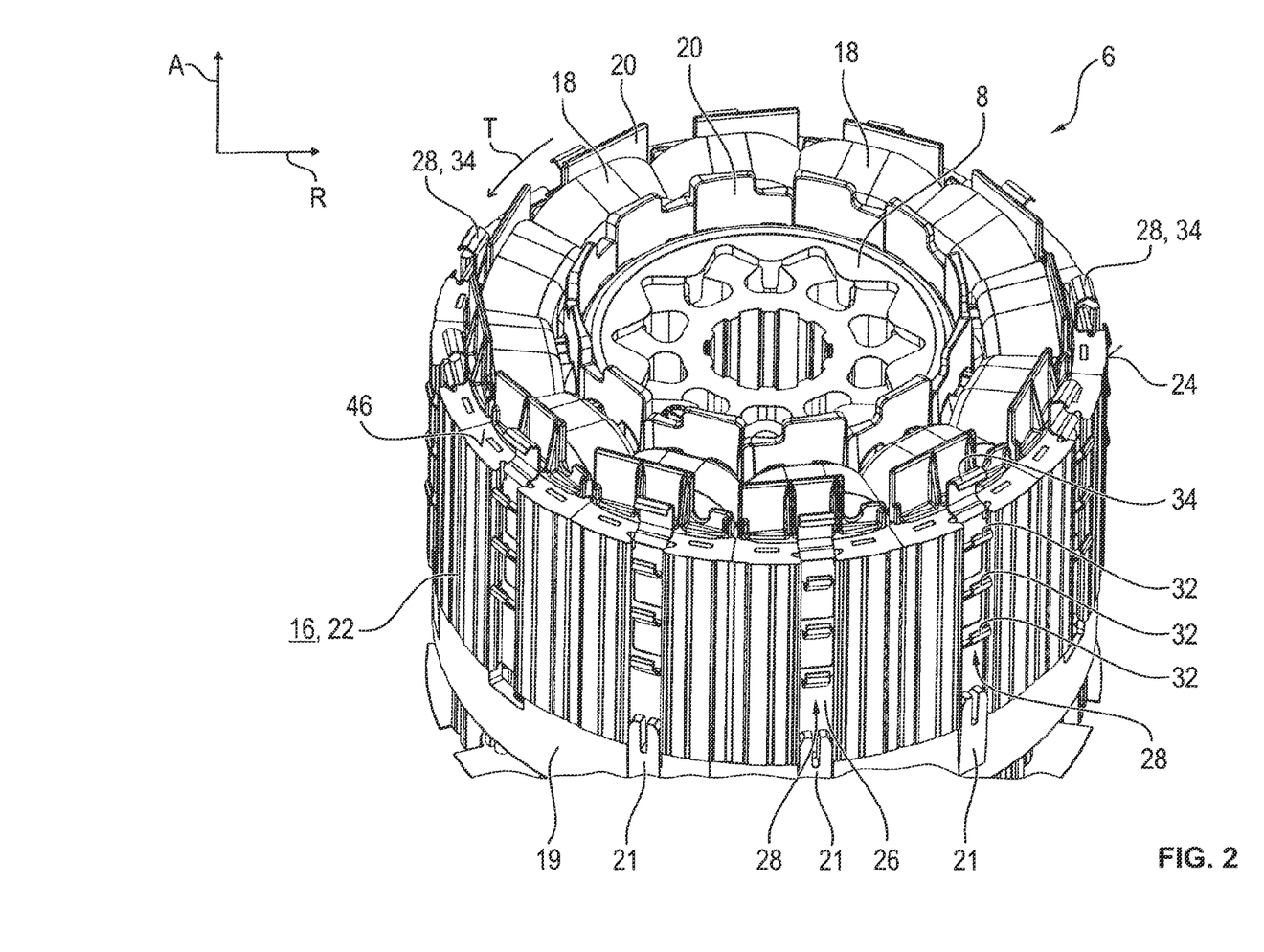
FIG. 2 is a perspective illustration of a stator and a rotor of the electric motor.
Figure 3:
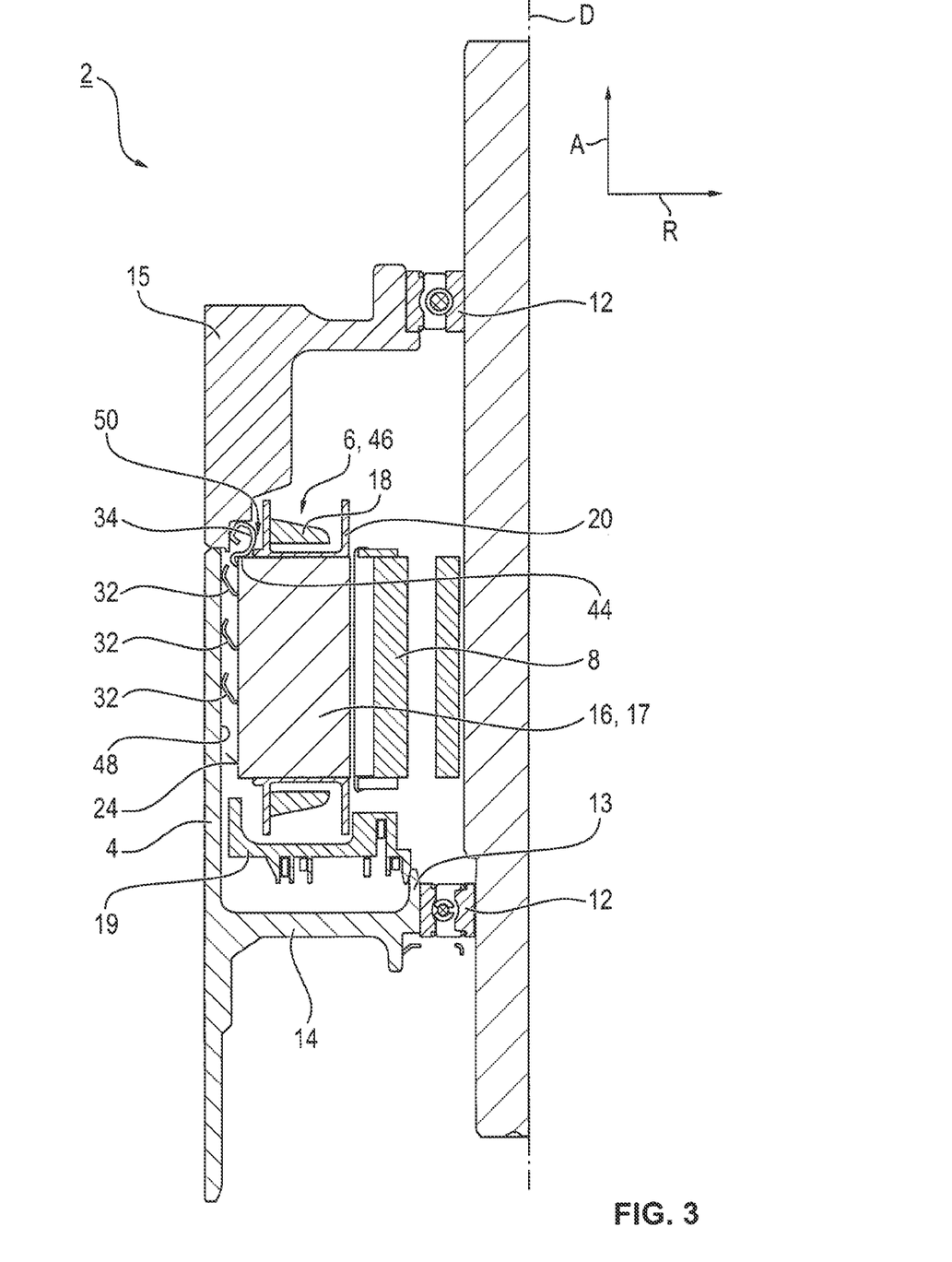
FIG. 3 is a sectional illustration showing a portion of the electric motor.

Referring now to the figures of the drawing in detail and first, in particular, to FIG. 1 thereof, there is shown an electric motor 2 with a motor housing 4 that contains a stator 6 and a rotor 8 (FIG. 2). The electric motor 2 in this exemplary embodiment is configured as an internal rotor electric motor. The rotor 8 is assembled on a motor shaft 10 so as to be fixed on the latter. The motor shaft 10 is rotatably mounted by way of two bearings 12. The bearings 12 in this case may be ball bearings, for example. With reference to FIG. 3, one of the bearings 12 is disposed in a bearing seat 13 of a housing base 14, embodied as a (housing) partition wall, of the motor housing 4. The other bearing 12 is disposed in a bearing bracket 15 which as a cover is placed axially on the can-shaped motor housing 4 so as to be on an end side opposite the housing base 14.

The stator 6 illustrated in more detail in FIG. 2 and FIG. 3 has a stator main body 16. The stator main body 16 in the exemplary embodiment illustrated is embodied with twelve stator teeth 17 which in the radial direction (R) extend (radially) inward, in the direction of the central rotation axis D illustrated in the drawing. Voids which are not identified in more detail and in which the windings of (stator) coils 18 are received are formed between the stator teeth 17. The windings are connected to one another by way of a wiring ring 19 on the end side, for example in a star connection or delta connection, while forming a stator or rotating field winding. The coils 18 here are disposed on isolating coil bodies 20 which are placed on the stator teeth 17 (FIG. 3). The coils 18 and coil bodies 20 in the figures are provided with reference signs only by way of example. The wiring ring 19 is placed on the end side of the stator main body 16 and fastened in the axial grooves 26 by means of latching tongues 21. The latching tongues 21 here act as positioning or centering cams.

The stator main body 16 has a stator yoke 22 or back iron which circumferentially encases the stator teeth 17. The stator main body 18 in the exemplary embodiment shown is embodied in the so-called individual tooth design in which the stator 6, or the stator main body 16 thereof, respectively, is assembled from individual stator teeth 17. In an alternative exemplary embodiment, not shown, the stator main body 16 is embodied in a star yoke design in which the stator yoke 22 is a separate component, and wherein the stator teeth 17 form a so-called stator star which is inserted in the stator yoke 22. The stator 6, or the stator main body 16, respectively, or the stator teeth 17 are embodied as solid elements, for example, or are constructed as lamination stacks from individual laminations.

Axial grooves 26 which run in the axial direction A and extend radially inward toward the rotation axis D are incorporated in the stator main body 16 on the external circumference 24 of the stator yoke 22, that is to say externally circumferentially. The respective axial groove 26 here is in particular embodied as a radial dovetail-shaped or T-shaped undercut of the external circumference 24. A spring element 28 is inserted radially in a form-fitting manner in the respective axial grooves 26. The axial grooves 26 and spring elements 28 are provided with reference signs only by way of example in the figures.

Viewing the illustrations of FIGS. 4 to 7, the spring element 28 has a strip-shaped or plate-shaped main body 30 on which are integrally molded three first coupler springs or spring arms 32, and one second coupler spring 34 as well as three pairs of clamping claws 36.

Figure 5:
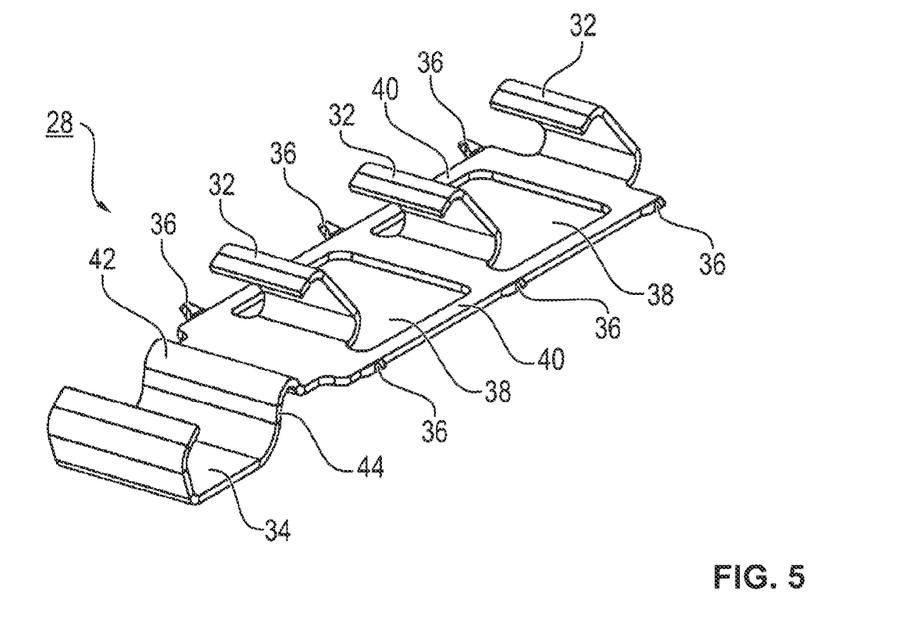
FIG. 5 is a perspective illustration showing the spring element.
Figure 6:
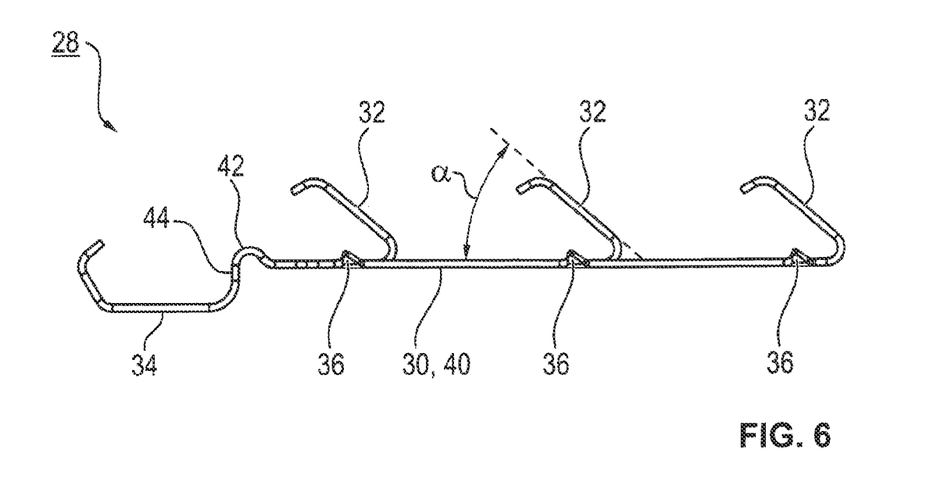
FIG. 6 is a side view of the spring element.
Figure 7:
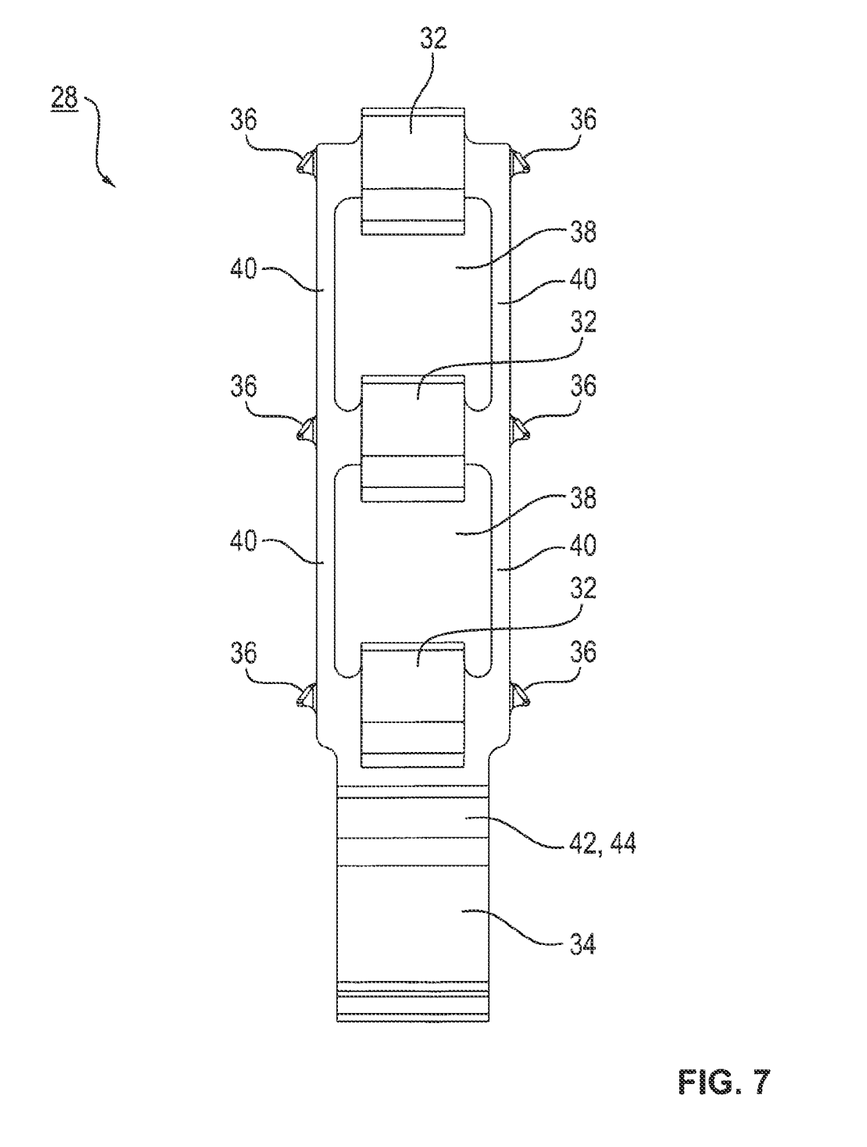
FIG. 7 is a plan view of the spring element.

The coupler springs or spring arms 32 hereunder are also referred to as radial springs, and the coupler spring 34 is referred to as an axial spring. The spring element 28 here is embodied in particular as a stamped bent part. The axial spring 34 here is a spring-elastic (spring) tab which is bent to an approximate C-shape or U-shape and is disposed on a narrow side or end side of the substantially rectangular main body 30.

The spring-elastic radial springs 32 as stamped tabs are formed from the main body 30, and bent from the plane of the main body 30 so as to be approximately C-shaped or U-shaped. To this end, two of the radial springs 32 are disposed in the body of the main body 30 so that two stamped, window-type openings or clearances 38 are formed in the main body 30. The third radial spring 32 is integrally molded on a narrow side or end side of the main body 30 that lies opposite the axial spring 34. The main body 30 protrudes beyond the radial springs 32 in the radial direction R and, at least for the two radial springs 32 stamped out in the interior of the main body 30, also in the axial direction A. In this way, the main body 30 protrudes beyond the radial springs 32 on both sides in the circumferential or tangential direction T, as is comparatively clearly apparent in FIG. 7. The spring element 28, by way of this protrusion 40 on both sides, engages from the rear groove flanks that are formed within the axial groove 26 by virtue of the dovetail shape or T-shape. The protrusion 40 hereunder is also referred to as a connection web or attachment web. In other words, the groove flanks form an undercut for the spring element 28 pushed axially into the axial groove 26.

As is apparent in particular in FIG. 6, the approximately U-shaped radial springs 32 are bent in such a manner that the horizontal U-leg of the latter has an acute angle of inclination a in relation to the main body 40. The radial springs 32 in the exemplary embodiment shown have an angle of inclination a of approximately 40°, thus in particular 40°±5°. The characteristic of the radial springs 32, thus the ratio between spring force and spring travel, is adjusted by the angle of inclination a. The angle of inclination a here is expediently adapted to the respective application.

The radial springs 32, or the angles of inclination a, respectively, here are open in the direction of the bearing bracket 15. The spring element 28 in the lateral view (FIG. 6) thus has an approximately fir tree-shaped or sawtooth-shaped geometry. For assembling, the stator 6 is inserted axially into the motor housing 4, wherein the radial springs 42 by way of the free ends thereof slide along the motor housing 4 and in the process are compressed in the direction of the rotation axis D, or in the direction of the main body 30, respectively. The raised radial springs 32 thus also act as introduction aids for positioning the stator 6 in the motor housing 4.

Three clamping claws or clamping teeth 36 as approximately triangular interlocking cams are in each case integrally molded on the main body 30 of the spring element 28, so as to be on the outside of the protrusions 40 on both longitudinal sides. The clamping claws 36 are bent upward from the plane of the main body 30, in the direction of the raised radial springs 32.

An approximately U-shaped bending location 42 is provided between the narrow side of the main body 30 and the axial spring 34, said bending location 42 from the plane of the main body 30 first being bent in the direction of the radial springs 32 and subsequently in the direction counter thereto, wherein a vertical U-leg of the bending location 42 here transitions to, or opens into, the approximately U-shaped bend of the axial spring 34. The U-leg 44 here forms a bearing edge or bearing face which from the plane of the main body 40 extends substantially in the radial direction R on the side of the main body 30 that lies opposite the radial springs 32. As is apparent in FIG. 3, for example, and in particular in FIG. 4, the spring element 28, in the assembled state inserted in the respective axial groove 26, by way of this bearing edge or bearing face 44 bears on an end side 46 of the stator main body 16 or the stator yoke 22 of the latter, respectively.

Figure 4:
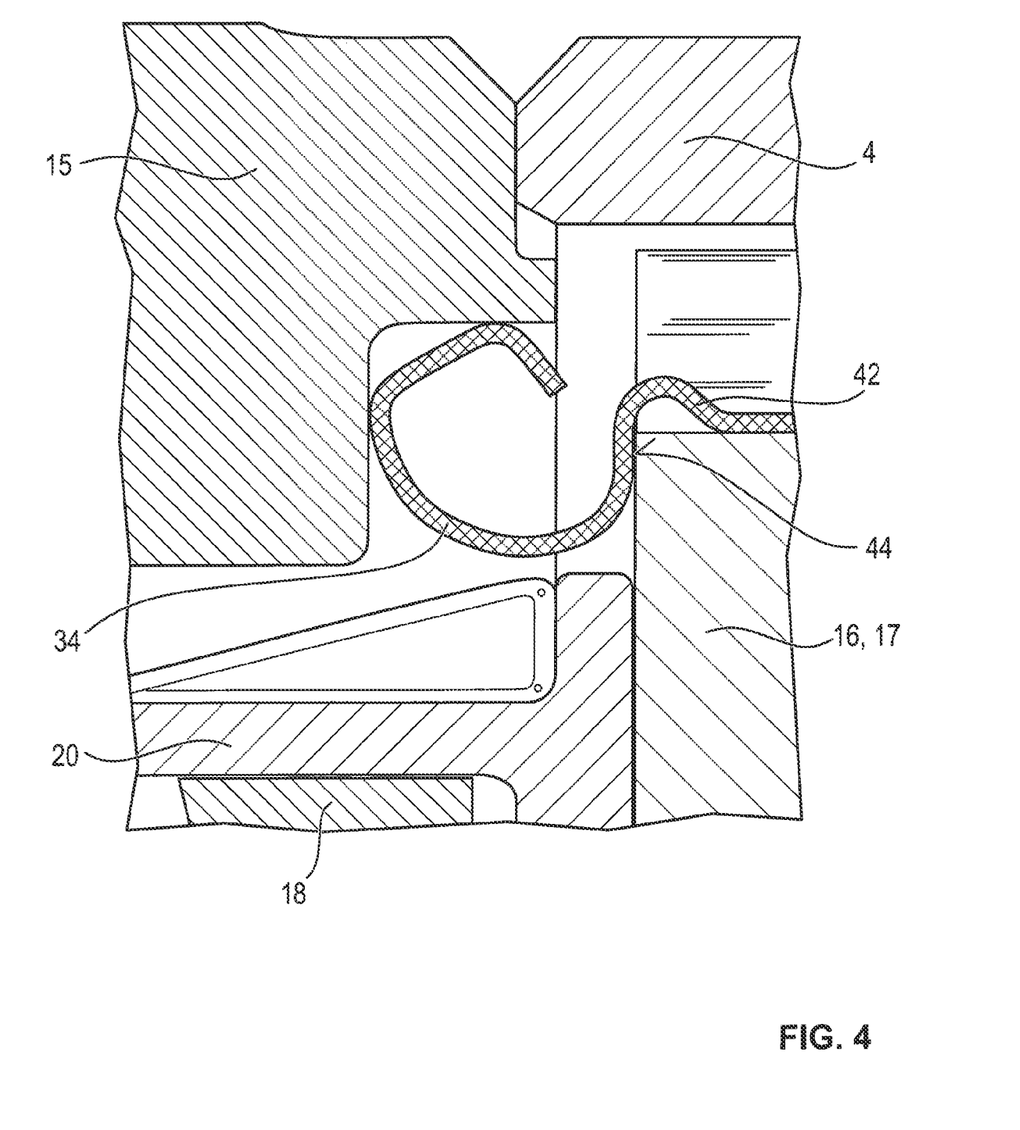
FIG. 4 is a sectional view showing a portion of a spring element of the stator.

The axial spring 34 in the assembled state extends axially beyond the axial groove 6 and the end side 36 of the stator main body 16. The axial spring 34 here is in particular disposed on the end side 46 of the stator main body 16 that lies opposite the wiring ring 19. The wiring ring 19 here is disposed in particular so as to face the housing base 14, and the axial springs 34 are disposed in particular so as to face the bearing bracket 15.

FIG. 3 and FIG. 4 in sectional illustrations show portions of the electric motor 2 in a radial and an axial section plane.

As is apparent in particular in FIG. 3, the stator 6, by way of the radially raised radial springs 32 of the spring elements 28, which in the radial direction R thus protrude from the stator 6 on the external circumference 24, bears on an internal wall 48 of the motor housing 4. In particular, the radial springs 32 in the region of the free ends or extremities thereof here bear in a resilient or articulated manner on the internal wall 48. In this way, the stator 6 is decoupled from the motor housing 4 of the, for example, 10-pole electric motor 2.

Furthermore, the stator 6 on the end side, by way of the axial springs 34 of the spring elements 28, bears on the bearing bracket 15 and is thus also decoupled in relation to the latter (FIG. 4). The axial springs 34 here, by means of the bearing edges or bearing faces 44, are supported on the end side 46 and at a free end are compressed or bent toward the bearing bracket 15 on an edge of a spring installation space 50. The transmission of the structure-borne noise, which is caused for example by the operationally caused electromagnetic forces, to the motor housing 4 and the bearing bracket 15 is reduced as a result in that the stator 6 by means of the spring elements 28 is decoupled from the motor housing 4 and optionally from the bearing bracket 15. The spring elements 28 here preferably also have damping, fixing and/or positioning properties. An anti-rotation safeguard of the stator 6 in the motor housing 4 is in particular implemented by the spring elements 28 bearing on the internal wall 48 and the bearing bracket 15.

The spring elements 28 can be inserted in the axial direction A into the axial grooves 26 in an automated and particularly simple manner. Moreover, the spring elements 28 are held radially in a form-fitting and thus reliable manner within the axial grooves 26. Furthermore, even further fixing of the spring elements 28 as a result of the azimuthally raised and radially slightly bent clamping claws 36 is implemented. Form-fitting and/or force-fitting fixing in the tangential and axial direction of the axial grooves 26 is implemented in particular here.

The invention is not limited to the exemplary embodiment described above. Rather, other points of the invention may also be derived therefrom by the person skilled in the art without departing from the subject matter of the invention. Furthermore, individual features described in the context of the exemplary embodiment may in particular be combined with one another in a different way without departing from the subject matter of the invention.

The electric motor 2 shown in the exemplary embodiment is in particular a steering motor of a motor vehicle. The solution described above may be used not only in the specially illustrated application but in a similar embodiment also in other automotive applications such as, for example, in electric brake motors, door and tailgate systems, power windows, as well as in electric drives and the disposal of the latter in the vehicle, or in other electric machines and systems.

The following is a summary list of reference numerals and the corresponding structure used in the above description of the invention:

2 Electric motor
4 Motor housing
6 Stator
8 Rotor
10 Motor shaft
12 Bearing
13 Bearing seat
14 Housing base
15 Bearing bracket
16 Stator main body
17 Stator tooth
18 Coil
20 Coil body
21 Latching tongue
22 Stator yoke
24 External circumference
26 Axial groove
28 Spring element
30 Main body
32 Coupler spring/radial spring
34 Coupler spring/axial spring
36 Clamping claw
38 Clearance
40 Protrusion
42 Bending location
44 U-leg/bearing edge/bearing face
46 End side
48 Internal wall
50 Spring installation space
A Axial direction
R Radial direction
T Tangential direction
D Rotation axis

The invention claimed is:

1. A stator for an electric motor, the stator comprising:
a stator main body formed with stator teeth in a star-shaped arrangement and a stator yoke;
said stator main body having an external circumference formed with a number of axial grooves, each of said axial grooves being a radial undercut of the external circumference; and
spring elements inserted with a radial form-fit in said axial grooves and projecting radially on the external circumference of said stator main body, and said spring elements engaging said undercut formed in the axial groove from a rear of the undercut.

2. The stator according to claim 1, wherein said spring element has a spring main body and at least one first coupler spring projecting in a radial direction and protruding from a respective said axial groove.

3. The stator according to claim 2, wherein said spring main body of said spring element has a narrow side with a second coupler spring that protrudes axially from the respective said axial groove.

4. The stator according to claim 3, wherein said spring element in a region of said second coupler spring has a bearing edge or bearing face by way of which said spring element bears on an end side of said stator main body.

5. The stator according to claim 4, wherein said spring element on a longitudinal side of said main body has at least one clamping claw for tangential fastening in said axial groove.

6. The stator according to claim 2, wherein said spring element on a longitudinal side of said main body has at least one clamping claw for tangential fastening in said axial groove.

7. The stator according to claim 6, wherein said at least one clamping claw is bent upward from a plane of said main body.

8. The stator according to claim 1, wherein said spring element is a one-piece integrally formed stamped bent part.

9. An electric motor, comprising:
a motor shaft and a rotor affixed to said shaft;
a motor housing; and
a stator according to claim 1 disposed in said housing;
said stator, with said spring elements inserted in said axial grooves on the external circumference, being held radially with a form-fit in said motor housing.

10. The electric motor according to claim 9, wherein said spring elements are axially inserted into said axial grooves on the external circumference of said stator.

11. A spring element, comprising:
a main body having at least one first coupler spring projecting in a radial direction, being a stamped tab incorporated in said main body and bent upward from a plane of said main body, and having a second coupler spring formed on a narrow side of said main body;
said spring element being configured for insertion into an axial groove of a stator, and said spring elements being configured to engage an undercut formed in the axial groove from a rear of the undercut.

* * * * *